(12) United States Patent
Slater et al.

(10) Patent No.: US 7,755,818 B2
(45) Date of Patent: Jul. 13, 2010

(54) HIGH-INTEGRITY SEAL FOR OPTICAL ELEMENTS, DICHROMATED GELATIN HOLOGRAPHIC OPTICAL ELEMENTS IN PARTICULAR

(75) Inventors: Joseph B. Slater, Dexter, MI (US); Timothy J. Britton, Dexter, MI (US); Eric M. Ferree, Gainesville, FL (US)

(73) Assignee: Kaiser Optical Systems, Ann Arbor, MI (US)

(*) Notice: Subject to any disclaimer, the term of this patent is extended or adjusted under 35 U.S.C. 154(b) by 1820 days.

(21) Appl. No.: 10/352,309

(22) Filed: Jan. 27, 2003

(65) Prior Publication Data

US 2003/0151787 A1    Aug. 14, 2003

Related U.S. Application Data

(60) Provisional application No. 60/351,521, filed on Jan. 25, 2002.

(51) Int. Cl.
    *G03H 1/02* (2006.01)
(52) U.S. Cl. .................. 359/3; 359/1; 403/179
(58) Field of Classification Search ............. 359/1, 359/3, 291, 572, 573, 885; 430/1, 2; 403/179
    See application file for complete search history.

(56) References Cited

U.S. PATENT DOCUMENTS

| | | | | |
|---|---|---|---|---|
| 4,969,716 A | * | 11/1990 | Scobey et al. | 359/885 |
| 5,095,375 A | * | 3/1992 | Bolt | 359/1 |
| 6,160,645 A | * | 12/2000 | Chandross et al. | 359/3 |
| 6,646,778 B2 | * | 11/2003 | Gudeman et al. | 359/291 |

* cited by examiner

*Primary Examiner*—Audrey Y Chang
(74) *Attorney, Agent, or Firm*—Gifford, Krass, Sprinkle, Anderson & Citkowski, P.C.

(57) ABSTRACT

A method and apparatus for encapsulating optical elements, particularly dichromated gelatin (DGC) holographic optical elements (HOEs), exhibits a very high degree of environmental integrity. In broad terms, the optical element is disposed between opposing plates, and a metal seal soldered to the edge(s) of the plates to seal the optical element therewithin. In the preferred embodiment, the metalization includes chrome and nickel, or alloys thereof, followed by gold or platinum. The metalization is preferably applied using a low-temperature process such as vacuum deposition or sputtering. The metal seal may be in the form of a foil or wire. One or both of the plates are compatible with wavelengths of interest, and the technique may be used in transmissive and reflective configurations.

2 Claims, 1 Drawing Sheet

HIGH-INTEGRITY SEAL FOR OPTICAL ELEMENTS, DICHROMATED GELATIN HOLOGRAPHIC OPTICAL ELEMENTS IN PARTICULAR

REFERENCE TO RELATED APPLICATION

This application claims priority from U.S. Provisional Patent Application Ser. No. 60/351,521, filed Jan. 25, 2002, the entire content of which is incorporated herein by reference.

FIELD OF THE INVENTION

This invention relates generally to the encapsulation of optical elements, and, in particular, to apparatus and methods suitable to encapsulating dichromated gelatin (DGC) holographic optical elements (HOEs) in a manner that exhibits a very high degree of environmental integrity.

BACKGROUND OF THE INVENTION

Dichromatic gelatin-based (DCG) volume-phase holographic optical elements (HOEs) are used in a variety of applications and industries including spectroscopy, displays and fiber-optic communication and laser delivery systems. The optical performance advantages of these elements is well known but, due to the humidity sensitivity of the gelatin recording media, they are difficult to harden against the environment.

According to current techniques, the HOE is supported in a laminated sandwich, with the gelatin 102 being disposed between glass plates 104. However, the edges 106 of the gelatin remain exposed. Many sealing methods have been employed, most of which rely on some type of adhesive, typically epoxy. The most successful approach to date is to chemically etch the gelatin back from the edge of the glass and then laminate the glass cover. This creates an epoxy barrier 110 to the environment, as shown in FIG. 1.

Environmental specifications, particularly those used in the telecommunications industry, continue to become more stringent, however. So far, one of the most stringent specifications is the GR-1221-CORE Bellcore spec. One of the tests in this specification is known as "damp heat," which requires that the optical element to suffer no ill effects when exposed to 85° C. and 85 percent humidity for at least 500 hours. Extensive testing has not yielded any adhesive-based sealing method that adequately passes this test.

SUMMARY OF THE INVENTION

This invention resides in a method of encapsulating optical elements, particularly dichromated gelatin (DGC) holographic optical elements (HOEs), in a manner which exhibits a very high degree of hermeticity and environmental integrity. In broad terms, the optical element is disposed between opposing plates, and a metal seal soldered to the edge(s) of the plates to seal the optical element therewithin.

In the preferred embodiment, the metallization includes chrome and nickel, or alloys thereof, followed by gold or platinum. The metallization is preferably applied using a low-temperature process such as vacuum deposition or sputtering. The metal seal may be in the form of a foil or wire using a material that is solderable to the metallization; brass, copper, gold and platinum are generally applicable. One or both of the plates are compatible with wavelengths of interest, and the technique may be used in transmissive and reflective configurations.

DETAILED DESCRIPTION OF THE INVENTION

Figure 1:
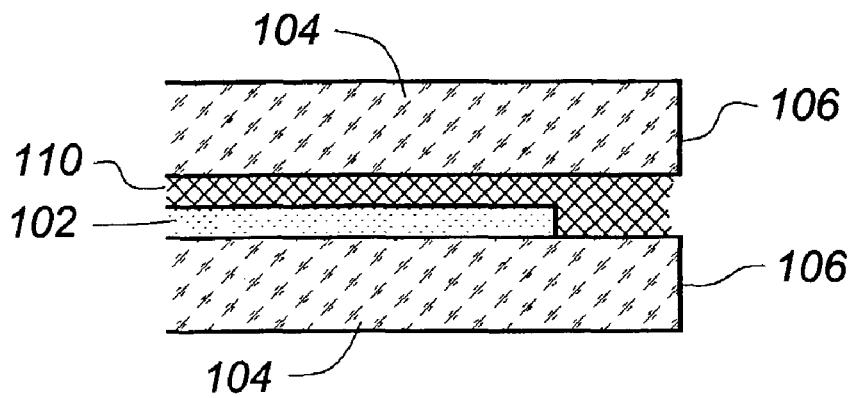
FIG. 1 illustrates a prior-art technique for encapsulating a holographic optical element.
Figure 2:
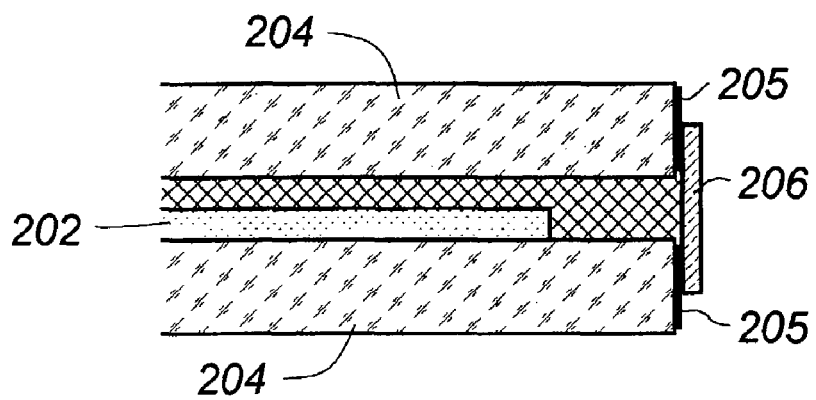
FIG. 2 is a cross-sectional drawing that depicts an improvement method of encapsulating an optical element according to the invention.
Figure 3:
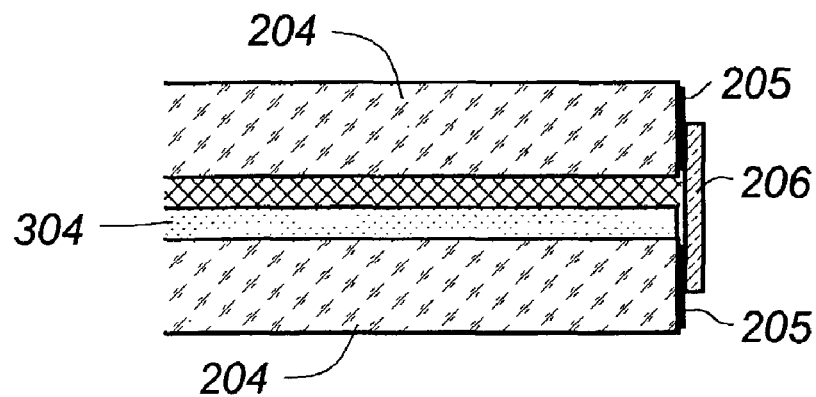
FIG. 3 is a cross-sectional drawing that depicts an alternative method of encapsulating an optical element according to the invention which does not use an etch-back.

This invention resides in a method and apparatus for encapsulating optical elements, including holographic optical elements (HOEs), in a manner which exhibits a very high degree of hermeticity and environmental integrity. A first embodiment is depicted in FIG. 2. According to this method, the edges of the hologram 202 are trimmed, and the edges of the glass 204 laminating element are metallized (205). A thin foil 206 or wire is then soldered to the edges, thus bridging the element and/or exposed epoxy. One advantage of the process is that, depending upon the application, the epoxy need not be etched back, as shown in FIG. 3.

The metallization process preferably uses a low-temperature process such as vacuum deposition, sputtering, or the like. The metallization itself is preferably a multi-layer stack including a chrome layer followed by nickel, copper and gold. The most preferred metallization is a commercially available stack consisting of a chrome/nickel alloy, followed by platinum. Low-temperature solders based upon indium as well as traditional lead/tin solders may alternatively be used.

We claim:

1. A multi-layer optical encapsulation, comprising:
   a dichromated gelatin (DCG) holographic optical element (HOE) disposed between opposing plates, each plate having a peripheral edge;
   metallization on the peripheral edge of each plate;
   a metal seal soldered across the metalized edge of each plate; and
   wherein the metalization includes the application of chrome and nickel, or alloys thereof, followed by the application of gold or platinum.

2. A method of encapsulating an optical element between opposing plates, each plate having a peripheral edge, the method comprising the steps of:
   providing a holographic optical element formed from dichromated gelatin;
   metalizing the peripheral edges of the opposing plates;
   soldering a metal seal to the metalized edges; and
   wherein the metalization includes the application of chrome and nickel, or alloys thereof, followed by the application of gold or platinum.

* * * * *